UNITED STATES PATENT OFFICE.

JOSHUA HOWE MARSHALL, OF RONDOUT, N. Y., ASSIGNOR TO HIMSELF AND HARVEY WEBSTER, OF SAME PLACE.

IMPROVEMENT IN CONDITION-POWDERS FOR HORSES AND CATTLE.

Specification forming part of Letters Patent No. 196,916, dated November 6, 1877; application filed October 14, 1876.

*To all whom it may concern:*

Be it known that I, JOSHUA HOWE MARSHALL, of Rondout, in the county of Ulster and State of New York, have invented a new and valuable Improvement in Medicinal Feed for Animals; and I do hereby declare that the following is a full, clear, and exact description of the construction and operation of the same.

This invention consists in compounding certain vegetables whereby I obtain a medicinal feed for horses or other animals, which composition, when mixed with their food, improves their health or condition; and it consists of the ingredients mixed in the proportions as will be hereinafter fully set forth.

In the manufacture of this feed I use three parts of bloodroot, five parts of gentian-root, five parts of licorice-root, three parts of elecampane, four parts of fenugreek, two parts of grains of paradise, three parts of anise-seed, four parts of ginger, six parts of charcoal, twenty-five parts of flaxseed-meal, and forty parts of wheat shorts.

These ingredients are mixed together, and are given to the animals with their food. The effect of each of these ingredients upon the animal is as follows: The bloodroot, or *Sanguinaria Canadensis*, excites the stomach, also accelerates the circulation of the blood. Gentian-root, or *Gentiana lutea*, acts as an appetizer, also assists digestion. Licorice-root, or *Glycyrrhiza glabra*, is an excellent demulcent, and beneficial in case of irritation of the bowels and urinary organs. Elecampane, or *Inula helenium*, acts as a tonic, and also gives relief in case of irritation of the mucous membranes. Fenugreek-seed, or the seeds of the plant *Fœnum Grœcum*, acts as a diuretic. Grains of paradise, or *Amomum melegueta*, acts as an aromatic stimulant. It improves the blood, promotes the formation of fat, and renders the hair of the animal smooth and glossy. Aniseseed, or *Pimpinella anisum*, an aromatic, also a useful remedy in case of colic and flatulencies. Ginger, or *Zingiber officinale*, acts as a stimulant and carminative. Charcoal acts as a disinfectant and absorbent. Flaxseed-meal, or the ground seed of the plant *Linum catharticum*, acts as a demulcent and emollient. Wheat shorts are nutritious, and also act as a laxative.

The ingredients above described possess other medicinal qualities, which it has not been thought necessary to mention.

This feed is purely a vegetable mixture; and it tends to invigorate the whole system of the animal, and keeps it in a lively and healthy condition.

This feed is intended more especially for horses, cattle, sheep, swine, and poultry.

What I claim as new, and desire to secure by Letters Patent, is—

An improved feed for animals, which consists of bloodroot, gentian-root, licorice-root, elecampane, fenugreek, grains-of-paradise seed, anise-seed, ginger, charcoal, flaxseed-meal, and wheat shorts, mixed, in or about the proportions as set forth, with a basis of food.

In testimony that I claim the above I have hereunto subscribed my name in the presence of two witnesses.

JOSHUA HOWE MARSHALL.

Witnesses:
G. WEBSTER,
JAS. B. MCCAUSLAND.